(12) United States Patent
Karges et al.

(10) Patent No.: US 7,365,549 B2
(45) Date of Patent: Apr. 29, 2008

(54) CIRCUIT CONFIGURATION FOR RECOGNIZING THE OCCUPANCY OF A SEAT AND SEATBELT WARNING IN A MOTOR VEHICLE

(75) Inventors: Peter Karges, Yokohama (JP); Michael Krempl, Ergoldsbach (DE); Hubert Melzl, Pentling (DE); Gerhard Wild, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/586,234

(22) PCT Filed: Jan. 12, 2005

(86) PCT No.: PCT/EP2005/050113

§ 371 (c)(1),
(2), (4) Date: Aug. 7, 2006

(87) PCT Pub. No.: WO2005/068264

PCT Pub. Date: Jul. 28, 2005

(65) Prior Publication Data

US 2007/0188181 A1    Aug. 16, 2007

(30) Foreign Application Priority Data

Jan. 16, 2004   (DE) .................. 10 2004 002 479

(51) Int. Cl.
*G01R 27/26* (2006.01)
(52) U.S. Cl. ............. 324/691; 73/862.044; 73/862.045
(58) Field of Classification Search ................ 324/691; 73/862.044, 862.045
See application file for complete search history.

(56) References Cited

U.S. PATENT DOCUMENTS

| 6,505,521 | B1 | 1/2003 | Petri et al. |
| 6,522,155 | B2 | 2/2003 | Pietsch et al. |
| 7,049,830 | B1 | 5/2006 | Thinnes |
| 2001/0040056 | A1 | 11/2001 | Schoos et al. |
| 2002/0021136 | A1 | 2/2002 | Pietsch et al. |
| 2002/0195016 | A1* | 12/2002 | Darraba et al. ............. 102/201 |

(Continued)

FOREIGN PATENT DOCUMENTS

DE    200 14 200 U1    12/2000

(Continued)

OTHER PUBLICATIONS

Billen et al:" Occupant Classification System for Smart Restraint Systems", I.E.E. International Electronics & Engineering, Luxembourg, 1999.

*Primary Examiner*—Vincent Q. Nguyen
(74) *Attorney, Agent, or Firm*—Laurence A. Greenberg; Werner H. Stemer; Ralph E. Locher

(57) ABSTRACT

A circuit configuration recognizes the occupancy of a seat and triggers a seat belt warning in a motor vehicle. Resistance elements are disposed in a separated and flat manner on a motor vehicle seat, in particular on a sensor seating mat, which alters the resistance values when a force is exerted thereon, for example, perpendicular to the surface of the vehicle seat, or by bending. The weight-sensitive resistance elements contain first resistance elements and additional resistance elements, and the resistance values thereof can be measured in respectively different measuring circuits without the measuring results for the first resistance elements influencing the measuring results for the additional resistance elements.

4 Claims, 5 Drawing Sheets

U.S. PATENT DOCUMENTS

| | | |
|---|---|---|
| 2003/0023414 A1 | 1/2003 | Lich et al. |
| 2005/0072249 A1* | 4/2005 | Maeda et al. .......... 73/862.046 |
| 2006/0150752 A1 | 7/2006 | Lorenz et al. |

FOREIGN PATENT DOCUMENTS

| | | |
|---|---|---|
| DE | 101 43 326 A1 | 3/2003 |
| DE | 101 63 880 A1 | 7/2003 |
| DE | 20 2005 000 018 U1 | 4/2005 |
| EP | 0 758 741 A2 | 2/1997 |
| JP | 2004268869 A | 9/2004 |
| WO | 01/18515 A1 | 3/2001 |
| WO | 2005/000637 A1 | 1/2005 |

* cited by examiner

CIRCUIT CONFIGURATION FOR RECOGNIZING THE OCCUPANCY OF A SEAT AND SEATBELT WARNING IN A MOTOR VEHICLE

BACKGROUND OF THE INVENTION

Field of the Invention

The invention relates to a circuit configuration for recognizing the occupancy of a seat and seat belt warning in a motor vehicle. Resistance elements are arranged in a separated and flat manner on a motor vehicle seat which alters the resistance values when for example a normal force is exerted perpendicular to the surface of the vehicle seat, and/or by bending. The resistance elements, which can be said to be sensitive both to weight and to bending, comprise not only first resistance elements for recognizing the occupancy of a seat, being connected to one another in parallel within a first measuring circuit between a first measuring connection and a second measuring connection, but also additional resistance elements for providing a seat belt warning. The additional resistance elements are used to recognize whether there is a person or an object on a vehicle seat and to give a warning if in addition the person recognized does not fasten the seat belt.

The use of weight-sensitive resistance elements for the purpose of recognizing seat occupancy in motor vehicles is sufficiently well known from automotive engineering. For example, with the aid of a vehicle seat having on its surface sensor seating mats consisting of resistance elements which are sensitive to weight (and to bending in the sense mentioned above), any change in the resistance values of the resistance elements due to normal force (and/or bending) is used as seat occupancy information. If necessary the said information is used to make some form of passenger restraint ready for triggering, for instance by arming or disabling a front or side air bag.

Such arrangements of resistors as sensor seating mats are known from the German utility model DE 200 14 200U1, corresponding to U.S. Pat. No. 6,522,155 B2, from the article "Occupant Classification System for Smart Restraint System", Society of Automotive Engineers Inc., 1999, BNS-DOCID XP-002184965. Examples of weight-sensitive resistance elements that are suitable as sensor elements in sensor seating mats are known from European patent document 0 758 741 B1, corresponding to U.S. Pat. No. 6,505,521 B1.

In a further known arrangement, in parallel with the variable resistance elements used hitherto in a sensor seating mat for recognizing seat occupancy, two further resistance elements, possibly constructed in the same way as the other resistance elements, are coupled in series and so arranged that it is possible to distinguish reliably between a heavy object and a vehicle occupant. For example it can be helpful to fix each of the two further resistance elements to a location on the surface of the vehicle seat usually occupied by the hip bones of a vehicle occupant. In this case, the resistance value of the two further weight-sensitive resistance elements falls. Once a person has been recognized in this way, a warning message is given to the passenger or at least to the driver if the seat belt associated with the vehicle seat occupied by a recognized person is not done up at the time of recognition. An appropriate seat belt warning can be an audible signal or an appropriate warning lamp on the vehicle instrument panel.

Lower resistance values in the resistance elements for seat belt warning are differentiated from a change in the resistance values of the resistance elements for recognizing seat occupancy by the fact that the two types of resistance element have different resistance value ranges.

The disclosed arrangement therefore has the disadvantage that the two additional resistance elements for providing a seat belt warning and the other resistance elements for recognizing seat occupancy have to be constructed differently in order to have different measurement ranges. In some cases this may involve additional labor costs during manufacture.

Moreover the known system is also intended to recognize when there is a break in a power supply line to one of the seating mat resistance elements. This is achieved in that a diagnostic resistor or diagnostic diode is connected in parallel to the weight-sensitive resistance elements of the sensor seating mat. In fact the results of measuring the resistance value of the diagnostic diode or the diagnostic resistor are strongly influenced by the weight-sensitive resistance elements for seat belt warning and the resistance elements for recognizing seat occupancy. Therefore the measurement ranges of the diagnostic resistor or the diagnostic diode also have to be different from the measurement ranges of the weight-sensitive resistance elements.

SUMMARY OF THE INVENTION

The object of the present arrangement, in the case of a sensor seating mat equipped with resistance elements for recognizing seat occupancy, is on the one hand to be able to measure the resistance on the seat belt warning resistance elements independently of the corresponding measurement on the resistance elements for recognizing seat occupancy, and on the other to be able recognize when there is a break in the power supply lines in a way that is not simultaneously affected by the seat belt warning resistance elements and the resistance elements for recognizing seat occupancy.

According to the invention, the circuit configuration for recognizing the occupancy of a seat and seat belt warning in a motor vehicle has first resistance elements which are not only weight-sensitive but also usually sensitive to bending and used for recognizing seat occupancy in a vehicle occupant protection system, as well as additional resistance elements which provide signals that may cause a vehicle occupant to be warned that a seat belt has been left undone. The first resistance elements are connected to one another in parallel within a first measuring circuit between a first measuring connection and a second measuring connection. According to the invention, a first additional resistance element is connected in a second measuring circuit between the first measuring connection and a third measuring connection, and a second additional resistance element is connected in a third measuring circuit between the second measuring connection and a fourth measuring connection. By this means, when measuring the resistance on the first additional resistance element via the first and third measuring connections of the circuit configuration and when measuring the resistance on the second additional resistance element via the second and fourth measuring connections of said arrangement, the first resistance elements of the sensor seating mat are electrically bypassed in each case, so that at the moment of measuring, a force being instantaneously exerted on the first resistance elements cannot corrupt the respective measurement results for the additional resistance elements.

Further exemplary embodiments of a circuit configuration according to the invention are specified in the individual sub claims.

For example it is advantageous if all resistance elements, that is, the first resistance elements and the additional resistance elements, are arranged as sensor elements on a seating mat for sensing the seat occupancy in a motor vehicle. At the same time it is particularly advantageous if the first resistance elements and the additional resistance elements have the same structural form, since they can then be very easily manufactured within the same production processes.

Furthermore it is advantageous to arrange a first diagnostic resistor parallel to the first additional resistance element and if necessary also a second diagnostic resistor parallel to the second additional resistance element. Due to the fact that the second measuring circuit and the third measuring circuit electrically bypass the first resistance elements, the variable resistance values of the first resistance elements have no effect at all on measurement of the two diagnostic resistors. It is therefore merely necessary to make sure that during manufacture the measurement range of the parallel additional resistance elements for seat belt warning is made wide enough to be distinguishable from the resistance values of the two diagnostic resistors.

Alternatively a diagnostic resistor can also be arranged parallel to the first resistance elements of the sensor seating mat for recognizing seat occupancy in such a way that its resistance value has no effect on the two additional resistance elements for seat belt warning and is just wide enough to be distinguishable from the value range of the total resistance of the parallel first resistance elements.

Moreover it is advantageous to manufacture the resistance elements for recognizing seat occupancy in "through mode" technology.

A sensor seating mat usually consists of a first and a second backing film kept apart from one another by spacers. At the locations of the sensor elements, a first conducting structure is attached to the first backing film and a second conducting structure to the second backing film so that they are opposite one another, both conducting structures having first and second electrical connections in each case. When a normal force or a bending force is exerted on the backing films the two conducting structures move closer together and eventually make contact, forming a contact surface with contact resistance which varies in proportion to the size of the normal force or the size and nature of the bending force. Through mode technology denotes that a weight-dependent resistance element, being a sensor element, is formed via the conducting section from the first electrical connection of the first conducting structure, via the contact surface of both conducting structures that becomes conducting when subjected to a weight loading, through to the second connection of the second conducting structure. Through mode technology makes it possible to arrange power supply lines to the weight-dependent resistance elements on one of the backing films and return lines from the resistance elements on the opposite backing film. In comparison with other technologies therefore, through mode technology allows the developer much greater freedom to arrange resistance elements on a sensor seating mat without being forced by space limitations to fit the sensor seating mat with supply lines that are too close together or even crossing, which could reduce the mechanical durability of the sensor seating mat and would make the signals from the resistance elements more susceptible to electromagnetic interference.

Since the two resistance elements for seat belt warning are usually positioned near the edges of the sensor seating mat, and as described above are usually at the supporting points for the hip bones of a vehicle occupant, they are few in number and their power supply lines are mostly quite short, so that the seat belt warning resistance elements may also be constructed in the more conventional "shunt mode" technology: a weight-dependent resistance element, being a sensor element, is then formed for instance via the conducting section from a first electrical connection of a first conducting structure of the resistance element on the first backing film, via a contact surface on the second backing film that is conducting when subjected to a weight loading, through to a second connection of a second conducting structure of the resistance element, though said second structure is arranged on the first backing film. Thus when the contact surface on the second backing film is subjected to pressure and/or bending, it merely provides the resistance element with a bypass resistance, that is, a shunt resistance.

The invention will be described below with the aid of an exemplary embodiment and a plurality of figures. The figures show the following:

DESCRIPTION OF THE PREFERRED EMBODIMENTS

Figure 3:
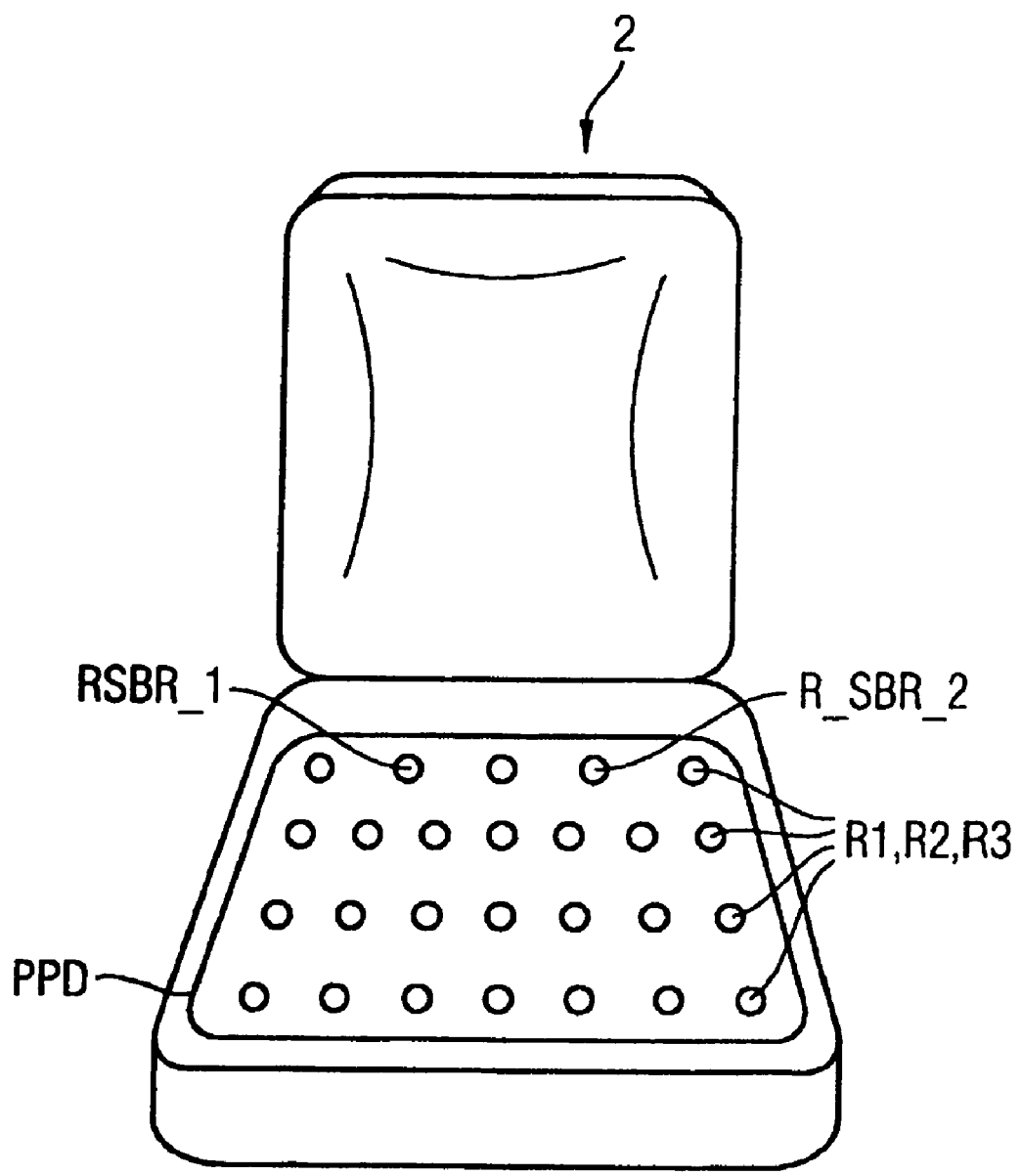
FIG. 3 A vehicle seat 2 with a sensor seating mat PPD having first resistance elements (R1, R2, R3, . . . ) and additional weight-dependent resistance elements R_SBR_1, R_SBR_2, FIG. 4 A resistance element R1 for recognizing seat occupancy in through mode technology, FIG. 5 The resistance element R1 for recognizing seat occupancy according to FIG. 4 in cross-section, FIG. 6 A resistance element R_SBR_1 for recognizing seat occupancy in shunt mode technology and FIG. 7 The resistance element R_SBR_1 for recognizing seat occupancy according to FIG. 6 in cross-section.

FIG. 3 shows a vehicle seat 3, on the surface of which a sensor seating mat PPD is arranged. The sensor seating mat has first resistance elements R1, R2, R3, . . . with weight-dependent variable resistance values which act as sensor elements 1 for recognizing seat occupancy in a motor vehicle. The sensor seating mat PPD also has two additional resistance values R_SBR_1 and R_SBR_2 with likewise weight-dependent variable resistance values. These two additional resistance elements R_SBR_1 and R_SBR_2 are arranged at locations on the vehicle seat 2 usually occupied by the hip bones of a vehicle occupant. This means that a strong force is exerted on these two additional resistance elements R_SBR_1 and R_SBR_2 by a person occupying the vehicle seat, whereas an object does not usually cause this particular loading. A control unit in the motor vehicle makes use of this distinction between a person and an object to issue a warning if a vehicle seat is occupied by a person and the person detected in said seat has not fastened the seat belt.

Figure 2:
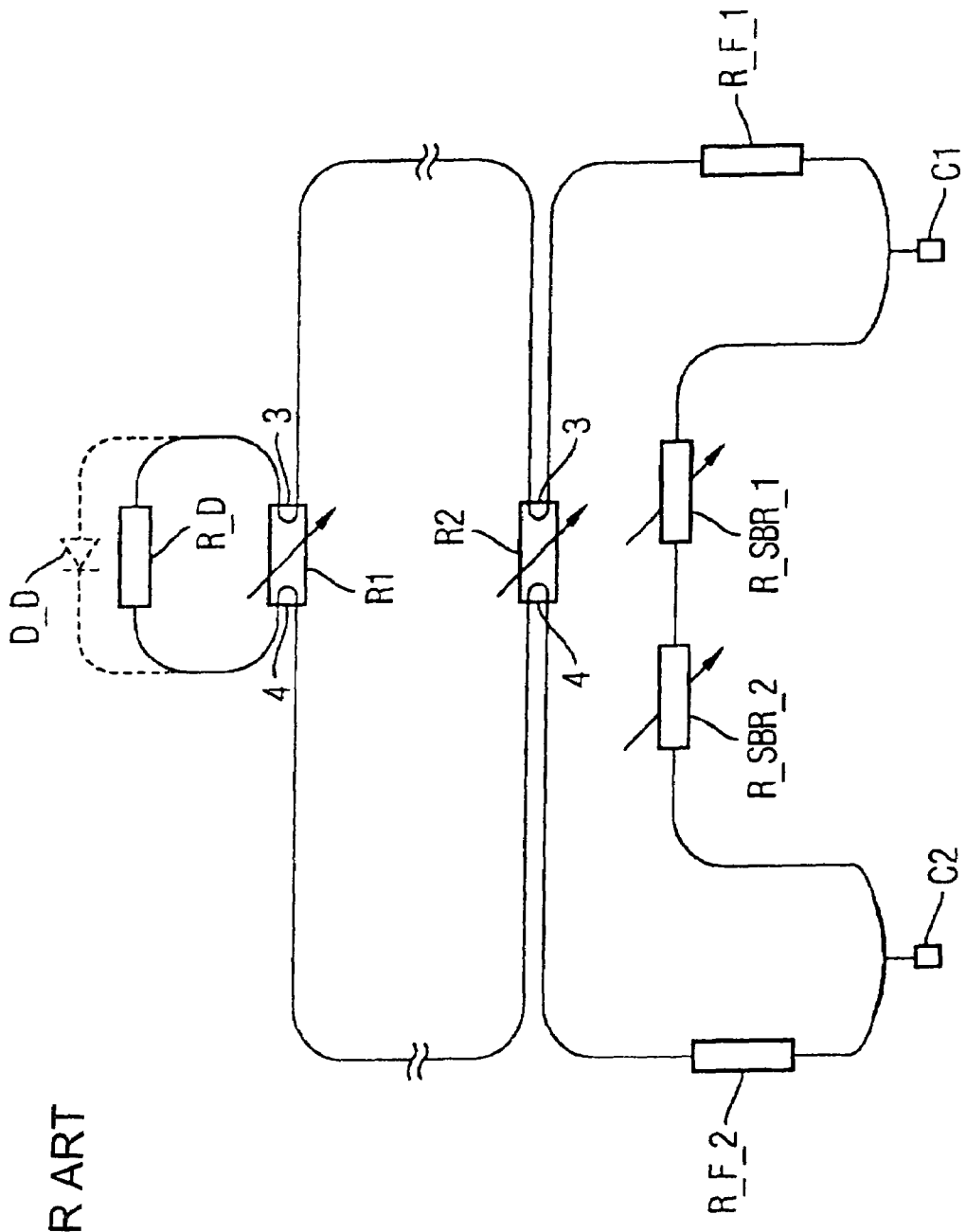
FIG. 2 A known circuit configuration.

FIG. 2 shows two first and two additional resistance elements R1, R2, R_SBR_1, R_SBR_2 of the sensor seating mat PPD from FIG. 3 in a known circuit configuration. The two first resistance elements R1 and R2 shown are merely exemplary of a plurality of first resistance elements of a sensor seating mat PPD, as is made clear by the interrupted lines connecting to the first and second electrical connections 3, 4 of the two resistance elements R1, R2.

The two resistance elements R1, R2 together with their respective first electrical connection 3 are connected via a fixed resistor R_F_1 to a first measuring connection C1, and together with their respective second connections 4 are connected via a second fixed resistor R_F_2 to a second measuring connection C2. Furthermore the two additional resistance elements R_SBR_1 and R_SBR_2 are connected in series between the said two measuring connections C1 and C4.

A resistance is measured via the two measuring connections C1 and C2 with the aid of a measuring circuit (not shown), said resistance being largely defined by the first resistance elements R1 and R2 and the two additional resistance elements R_SBR_1 and R_SBR_2.

In the unoccupied state the first resistance elements R1 and R2 have a resistance value in the MΩ range. As soon as a sufficiently large weight is exerted on the sensor elements R1 and R2, their resistance value is between 40 and 60 kΩ per sensor element R1, R2. In the case of FIG. 2 the total resistance value of the two sensor elements R1 and R2 is approx. 25 kΩ. When the two additional resistance elements R_SBR_1 and R_SBR_2 are in the depressed state they have a common resistance value between 0.5 kΩ and 1.5 kΩ. If a person occupies the vehicle seat, then not only the first resistance elements R1, R2 but also the additional resistance elements R_SBR_1 and R_SBR_2 receive a loading. The total resistance of this arrangement of resistors is measurable via the two measuring connections C1 and C2, and in this way is reliably differentiated from a situation in which for example only the first resistance elements R1, R2 receive a weight loading. This makes it possible to determine whether a person is occupying the vehicle seat.

In order to ensure that the total resistance between C1 and C2 cannot drop below a minimum resistance value when the additional resistance elements R_SBR_1 and R_SBR_2 are under only a light load or no load at all, in the power supply line a first fixed resistor R_F_1 is arranged between the first measuring connection C1 and the first connections 3 of the first resistance elements R1 and R2 and a second fixed resistor R_F_2 is arranged between the second measuring connection C2 and the second electrical connection 4 of the first resistance elements R1 and R2. Said resistors have a fixed resistance value of approx. 20 kΩ each.

When the additional resistance elements R_SBR_1 and R_SBR_2 are under no load, if a break occurs in the line between the first measuring connection C1 and the first resistance elements R1 and R2, or in some cases also between the second measuring connection C2 and the two first resistance elements R1 and R2, a resistance value of several MΩ or greater can be measured between the first measuring connection C1 and the fourth measuring connection C4. In order to distinguish a line interruption unambiguously from a no-load sensor mat, either a diagnostic resistor R_D or a diagnostic diode D_D is connected in parallel with the first resistance elements R1 and R2. A diagnostic resistor R_D and a diagnostic diode D_D may be used as alternatives. This is made clear in FIG. 2 by the broken lines indicating the diagnostic diode D_D between the two measuring connections C1 and C4.

Figure 1:
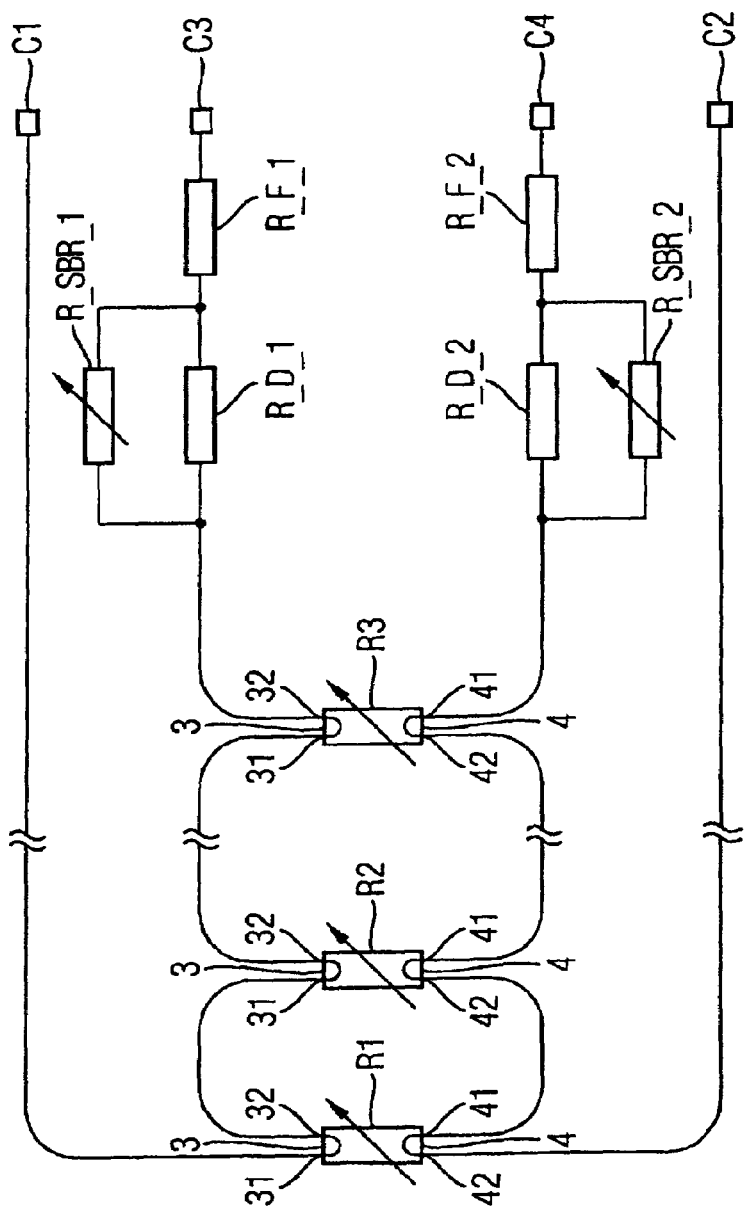
FIG. 1 A circuit configuration according to the invention.

FIG. 1 shows an exemplary embodiment of an inventive circuit configuration. The figure shows three first resistance elements R1, R2 and R3, connected in parallel, which are connected not only to their respective first connections 3 and to the first measuring connection C1 but also to a third measuring connection C3 via a first diagnostic resistor R_D_1 and a first fixed resistor R_F_1 connected in series downstream. At their respective second connections 4 the first resistance elements R1, R2 and R3, connected in parallel, are connected both to the second measuring connection C2 and also to the fourth measuring connection C4 via a second diagnostic resistor R_D_2 and a second fixed resistor R_F_2 connected in series downstream. A first additional resistance element R_SBR_1 is connected in parallel to the first diagnostic resistor R_D_1 and a second additional resistance element R_SBR_2 is connected in parallel to the second diagnostic resistor R_D_2.

Two interruptions are drawn in the connection lines between the first connections 3 of the first resistance elements R2 and R3 respectively, and also in the connection lines between the second connections 4 of the two first resistance elements R2 and R3. This indicates, as already indicated in the known embodiment from FIG. 2, that usually considerably more first resistance elements are connected in parallel to the three resistance elements R2, R3 shown. The breaks between the first resistance elements R1, R2, R3 and between the first measuring connection C1 and the second measuring connection C2 also indicate that the power supply lines may be very long in certain cases.

The circuit configuration shown in FIG. 1 is used to measure the resistance between the two measuring connections C1 and C3, said resistance representing the total resistance values of the additional resistance element R_SBR_1, the diagnostic resistor R_D_1, the fixed resistor R_F_1 and the power supply line resistances. The fixed resistor R_F_1 is optional and as in FIG. 2 its purpose is to define a minimum measured value in the circuit configuration. The diagnostic resistor R_D_1 is used to recognize line interruptions and must be distinguished from a triggered seat belt warning resistance element S_SBR_1 by means of a suitably different measurement range. Therefore in this case its resistance value is between 2 and 200 kΩ. If the total resistance of the parallel circuit containing the two resistances R_SBR_1 and R_D_1 is reduced by a force pressing on the resistance element R_SBR_1, this change is determined by means of a change in the total measured resistance between the two measuring connections C1 and C3.

The total resistance between the measuring connections C4 and C2 is also measured in the same way as the total resistance between the measuring connections C1 and C3. Comparing the network between the measuring connections C1 and C3 with the network between the measuring connections C2 and C4, the resistors R_SBR_2, R_D_2 and R_F_2 are arranged in the same way as the corresponding resistors R_SBR_1, R_D_1 and R_F_1. The resistance in the second network is measured in the same way as the resistance in the first network and therefore requires no further explanation.

Compared with the circuit configuration in FIG. 2, it is possible to measure the first and second additional resistance elements R_SBR_1 and R_SBR_2 in such a way that in the ideal case the first resistance elements R1, R2 and R3 have no effect on the measurement. For this reason the two resistance elements R_SBR_1 and R_SBR_2 can have the same measurement range and therefore be manufactured in exactly the same way as the first resistance elements R1, R2 and R3. This means that a sensor seating mat for recognizing seat occupancy having a circuit configuration according to FIG. 1 can be manufactured considerably more cheaply than if it had a circuit configuration according to FIG. 2.

It is also possible to measure the first additional resistance element R_SBR_and the second additional resistance element R_SBR_2 independently of one another. The advantage of this is that an unwanted shift in the measured value of only one of the two additional resistance elements R_SBR_1 or R_SBR_2 can be determined and a fault in the circuit configuration can be recognized and subsequently dealt with considerably more quickly and purposefully.

The circuit configuration in FIG. 1 has the further advantage that a break in the lines of the first network between C1 and C3 on the one hand and of the second network between C4 and C2 on the other can be elicited even without a diagnostic resistance element R_D or diagnostic diode D_D: measurement of the resistances in the first resistance elements R1, R2 and R3 via the two measuring connections C1 and C2 is thus not affected by an additional resistance value as in the circuit configuration according to FIG. 2.

A diagnostic diode D_D is for example mainly used in a circuit configuration according to FIG. 2 in place of a diagnostic resistor R_D when, with the aid of a resistance measurement in the circuit configuration between the two measuring connections C1 and C4, there is a need to distinguish by means of the direction of the electric current between a measurement with and a measurement without the diagnostic component D_D. This kind of outlay on circuitry and measurement is no longer necessary in the circuit configuration according to FIG. 1. Furthermore in the circuit configuration in FIG. 1, by reversing the direction of the electric current when measuring the first resistance elements R1, R2 and R3 a second measurement can be performed as a plausibility test, and should give the same result as the first measurement. This can act as a backup for the first measurement.

A further advantage of having independently measurable first resistance elements R1, R2, R3 and additional resistance elements R_SBR_1 and R_SBR_2 is that the measurement ranges of both resistance elements no longer need to be kept separate from one another in order to be able to distinguish from the measurement result whether at least one of the first resistance elements R1, R2, R3 has been depressed or in appropriate cases whether one of the two additional resistance elements R_SBR_1 or R_SBR_2 has also been depressed. The measurement range for the first resistance elements R1, R2, R3 can therefore be extended.

Figure 4:
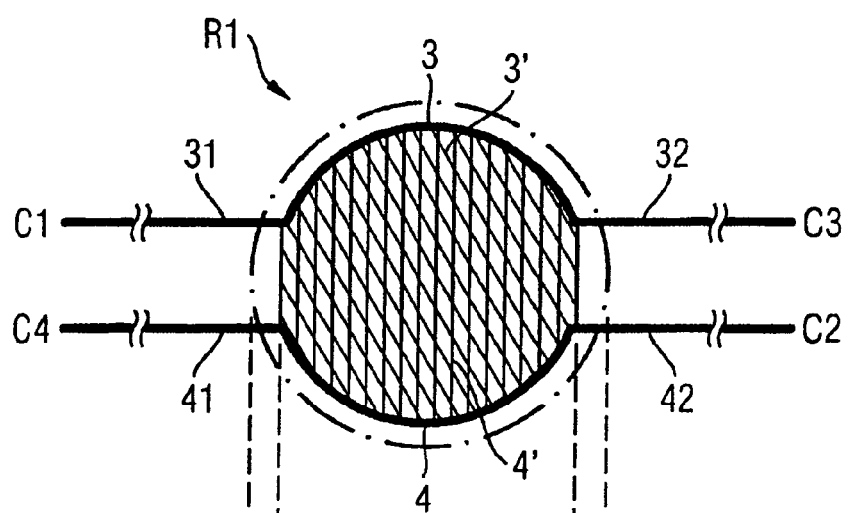

FIG. 4 shows a preferred resistance element R1 for recognizing seat occupancy, being exemplary of all the resistance elements R1, R2, R3, with conductors 3 and 4 between two-way connections 31 and 32, 41 and 42 respectively, being fed to the first measuring connection C1 and the third measuring connection C3, and the fourth measuring connection C4 and the second measuring connection C2, respectively.

In the diagram shown, the first conductor 3 forms a first arc curving upward toward the upper lateral face and the lower conductor 4 forms a second arc curving correspondingly down toward the lower end. The first conductor 3 is arranged on a first backing film PPD1 and the second conductor 4 is arranged on a second backing film PPD2. This will be fully explained below with the aid of the cross-section view of the resistance element R1 in FIG. 5.

The obliquely shaded surface 3' enclosed by the two arcs represents a semi-/conducting layer 3' arranged below the first conductor 3, and the vertically shaded surface 4' represents a semi-/conducting layer 4' arranged above the second conductor 4, so that the two semi-/conducting layers 3' and 4' face toward one another. The semi-/conducting layers 3' and 4' may be for example graphite layers 3' and 4'.

Unlike the diagram in FIG. 4, in a real embodiment of a first resistance element R1 the first and second conductors 3 and 4 completely fill the circular surfaces associated with the respective arcs shown, but it would be difficult to illustrate this clearly.

Figure 5:
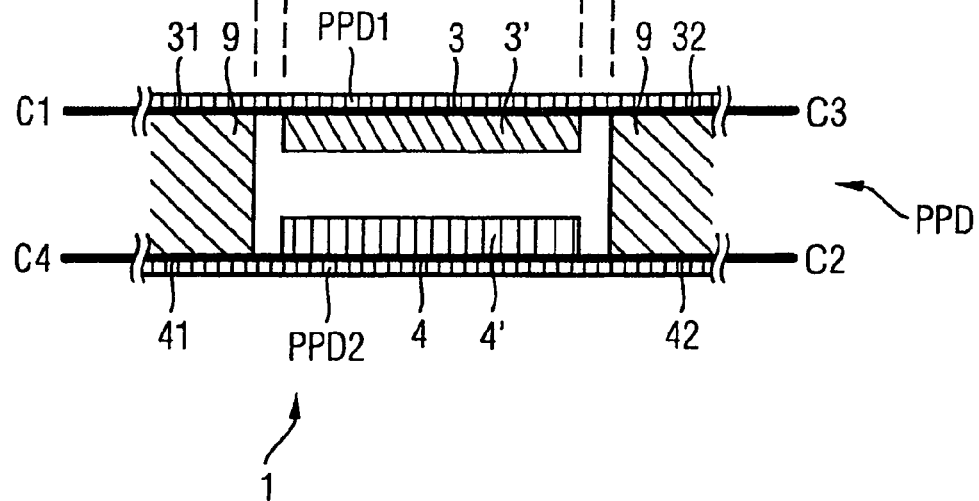

FIG. 5 shows the resistance element R1 from FIG. 4 as a cross-section through the sensor seating mat PPD. The first conductor 3 is arranged on the first backing film PPD1 and the second conductor 4 is arranged on the second backing film PPD2. The backing films PPD1 and PPD2 are kept apart from one another by spacers 9. There is a hollow space between the graphite layers 3' and 4' instead of a spacer 9.

Two-way pressure on the resistance element R1 in the direction of the hollow space deforms the resistance element R1 and the hollow space becomes smaller until the graphite layers 3', 4' fastened on the first conductor 3 and those on the second conductor 4 come into contact. As the pressure increases, the resistance value of the resistance element R1 between the drawn connections 31 and 34 of the first and second conductors 3, 4 respectively decreases further and further.

A power supply line on the first backing film PPD1 is fed from the connection 31 to the first measuring connection C1, and a further line is fed from the connection 42 along the second backing film PPD2 to the second measuring connection C2: the resistance element R1 is a resistance element in through mode technology.

Figure 6:
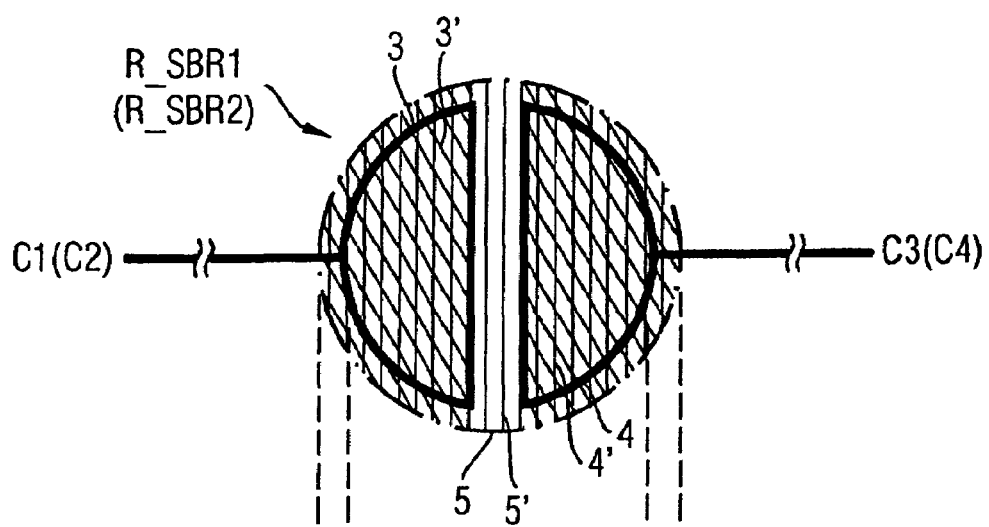
Figure 7:
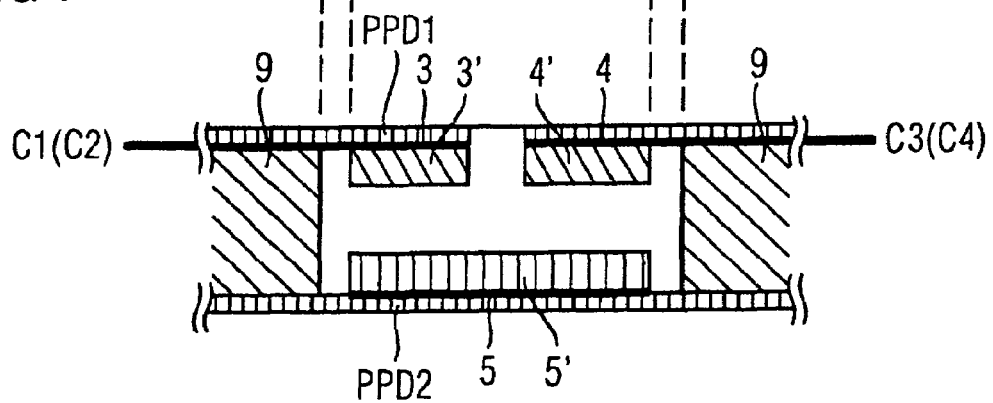

FIGS. 6 and 7 show a resistance element R_SBR1 for seat belt warning.

FIG. 6 shows a top view of the resistance element R_SBR1. The resistance element R_SBR_1 is in shunt mode technology.

Unlike the resistance element R1 from FIG. 4, the two conductors 3 and 4 are arranged opposite one another in the form of semicircles under the first backing film PPD1. To simplify illustration of the obliquely shaded graphite layers 3' and 4' lying directly under the conductors 3 and 4 respectively, the semicircles are not shown to cover them fully as would usually be the case for a real embodiment of such a resistance element R_SBR1.

The vertically shaded surface in FIG. 6 is the graphite layer 5' on the conductor 5 opposite the two graphite layers 3' and 4', and is arranged on the second backing film PPD2.

As in the case of the first resistance element R1 in FIGS. 4 and 5, the two backing films PPD1 and PPD2 are kept apart from one another by spacers 9, as a result of which the graphite layers 3' and 4' of the first backing film PPD1 are separated by a hollow space from the graphite layer 5' on the second backing film. If the graphite layers 3', 4' are pressed onto the opposite graphite layer 5', current can flow between the measuring connections C1 and C3, which are connected to the two conductors 3, 4.

The details described in FIGS. 6 and 7 with reference to the first resistance element S_BR1 also apply in equal measure to the second resistance element S_BR2, in which case the measuring connections C2 and C4 shown in parentheses take the place of the measuring connections described previously.

We claim:

1. A circuit configuration for recognizing an occupancy of a vehicle seat and triggering a seat belt warning in a motor vehicle, the circuit configuration comprising:
   a first measuring connection, a second measuring connection, a third measuring connection, and a fourth measuring connection; and
   a first measuring circuit connected between said first measuring connection and said second measuring connection, a second measuring circuit connected between said first measuring connection and said third measuring connection, and a third measuring circuit connected between said second measuring connection and said fourth measuring connection;

said first measuring circuit including resistance elements connected in parallel with each other;

said second measuring circuit including a first additional resistance element connected between said first measuring connection and said third measuring connection;

said third measuring circuit including a second additional resistance element connected between said second measuring connection and said fourth measuring connection; and said resistance elements, said first additional resistance element, and said second additional resistance element being weight-sensitive resistance elements disposed in a separated and flat manner on the vehicle seat.

2. The circuit configuration according to claim 1, further comprising a common sensor seating mat for recognizing the seat occupancy and triggering the seat belt warning in the motor vehicle;

wherein said resistance elements are sensor elements for recognizing the seat occupancy and are disposed on said common sensor seating mat; and wherein said first additional resistance element and said second additional resistance element are additional sensor elements for triggering the seat belt warning and are disposed on said common sensor seating mat.

3. The circuit configuration according to claim 1, further comprising:

a first diagnostic resistor connected in parallel to said first additional resistance element; and a second diagnostic resistor connected in parallel to said second additional resistance element.

4. The circuit configuration according to claim 2, wherein:

said common sensor seating mat has spacers and a first and a second backing film kept apart from one another by said spacers; and at least one of said sensor elements for recognizing the seat occupancy has two opposite conducting structures, a first of said two opposite conducting structures being disposed on said first backing film and a second of said two opposite conducting structures being disposed on said second backing film, each of said first and second conducting structures having electrical connections at both ends, and said first and second conducting structures being able to make electrical contact when a force is exerted on said first and second backing films, said electrical connections of said first conducting structure includes a first connection connected to said first measuring connection and a second connection connected to said third measuring connection, said electrical connections of said second conducting structure includes a first connection connected to said fourth measuring connection and a second connection connected to said second measuring connection.

* * * * *